United States Patent Office 3,513,319
Patented May 19, 1970

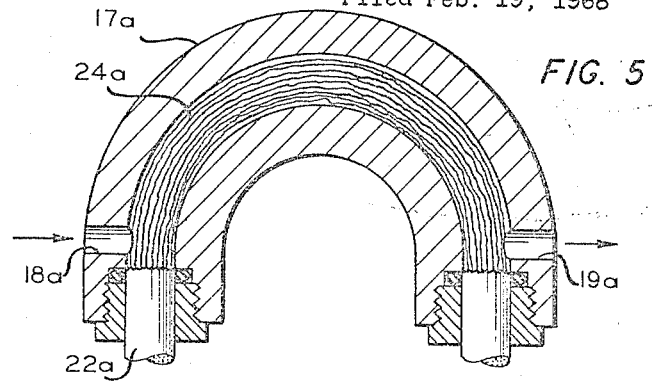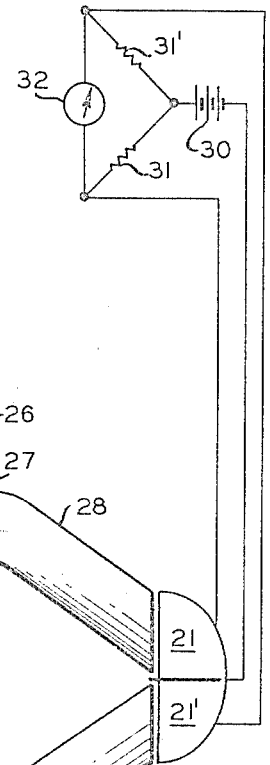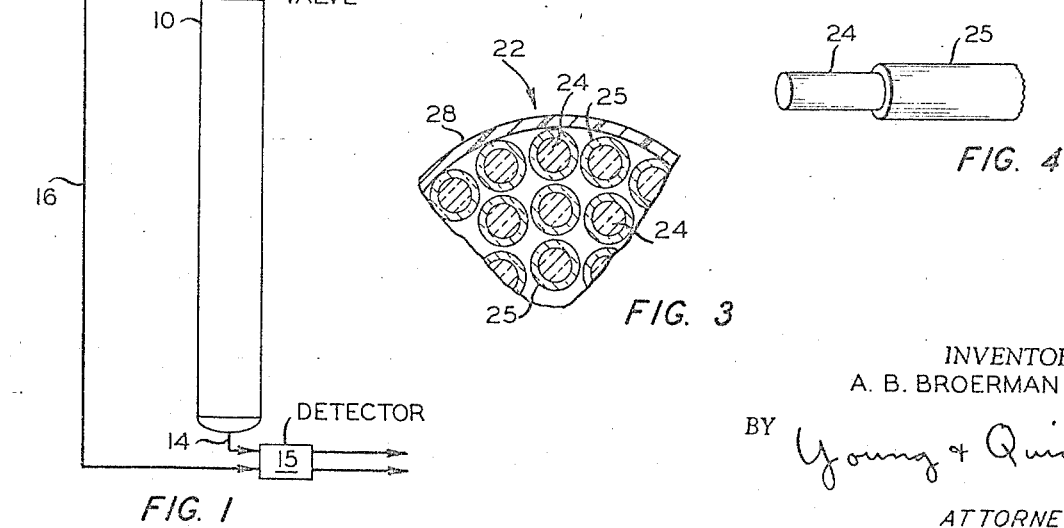

3,513,319
REFRACTOMETER HAVING SPACED
LIGHT CONDUCTING RODS
Arthur B. Broerman, Bartlesville, Okla., assignor to
Phillips Petroleum Company, a corporation of Delaware
Filed Feb. 19, 1968, Ser. No. 706,411
Int. Cl. G01n 21/26
U.S. Cl. 250—218                                      8 Claims

ABSTRACT OF THE DISCLOSURE

A refractometer comprises a bundle of radiation transparent tubes extending from a radiation source to a detector. The central sections of the tubes extend through a vessel which contains the liquid being analyzed. The outer sections of the tubes are clad with material having lower refractive indices than the tubes. A differential refractometer employing two such tube bundles and vessels is also provided. This refractometer is used as a detector in a chromatographic analyzer.

---

Various types of chromatographic analyzers have been developed in recent years for the analysis of sample mixtures. One specific type of such analyzers utilizes a liquid carrier fluid to displace the constituents of the sample through a suitable partitioning material. In view of the fact that liquid carrier fluids are normally employed in relatively small quantities, it is difficult to provide accurate detectors to detect the individual constituents of the sample in the column effluent. Among the detectors which have been proposed for this purpose are refractometers. However, most refractometers which are commercially available do not possess the desired degree of sensitivity or are not adapted to analyze small volumes of samples.

One specific type of refractometer known in the art employs a solid transparent tube which is submerged in a sample of the liquid to be analyzed. A light source is positioned adjacent one end of the tube, and a detector is positioned adjacent the second end. Light from the radiation source passes through the tube by internal reflection to the detector with a portion of the light escaping into the sample liquid, the amount of which is a function of the refractive index of the sample enclosing the tube. However, a refractometer of this type does not possess the sensitivity required in many applications, particularly as a detector for a liquid chromatographic analyzer.

In accordance with the present invention, an improved refractometer is provided which utilizes fiber optics. A substantial number of radiation transparent tubes are grouped together so as to extend from a radiation source to a detector. Each of these tubes is clad with a material having a refractive index lower than the refractive index of the tube itself so as to substantially increase the amount of radiation transmitted through the tube by internal reflection. The longitudinal central portion of the tube bundle is positioned within a vessel that contains the sample material to be analyzed. The claddings are removed from the tubes in this region so that the sample makes direct contact with the surface of the tubes and permits a portion of the light to escape. A compressive force is applied to the tube bundle within the vessel so as to tend to maintain the individual tubes out of physical contact with one another. This increases the surface area of the tubes in contact with the test fluid and reduces light transfer between the tubes. This refractometer is employed as a detector in a liquid chromatographic analyzer in one embodiment of this invention.

Accordingly, it is an object of this invention to provide an improved refractometer having high sensitivity and which is capable of operating with small amounts of sample material.

Another object is to provide an improved detector for a liquid chromatographic analyzer.

Other objects, advantages and features of the invention should become apparent from the following detailed description, taken in conjunction with the accompanying drawing in which:

FIG. 1 is a schematic representation of a chromatographic analyzer having the detector of this invention incorporated therein. FIG. 2 is a view, shown partially in section, of a first embodiment of the refractometer of this invention. FIG. 3 is a cross-sectional view illustrating a portion of the bundle of light tubes employed in the refractometer of FIG. 2. FIG. 4 illustrates one of the tubes in detail. FIG. 5 is a schematic representation, shown partially in section, of a second embodiment of a portion of the refractometer of this invention.

Referring now to the drawing in detail and to FIG. 1 in particular, there is shown a schematic representation of a chromatographic analyzer which includes a partitioning column 10. A carrier liquid is introduced through a conduit 11 to the inlet of a sample valve 12. A sample of fluid to be analyzed is introduced into valve 12 through a conduit 13. The effluent from column 10 is directed by a conduit 14 through the first channel of a detector 15. A portion of the carrier liquid is directed by a conduit 16 through the second channel of detector 15.

The apparatus of FIG. 1 thus far described constitutes a conventional chromatographic analyzer. The carrier liquid initially flows through column 10 and the first channel of detector 15. Periodically, sample valve 12 is actuated to introduce the predetermined quantity of sample material into the column. Thereafter, the continued flow of carrier liquid elutes the constituents of the sample from the column in sequence, and these constituents are detected by comparing a property of the column effluent with the carrier liquid flowing through conduit 16.

In accordance with this invention, detector 15 comprises a differential refractometer of the type to be described. A first embodiment of this refractometer is illustrated in FIG. 2. A first vessel or housing 17 is provided with a central passage through which the effluent from column 10 is circulated. To this end, housing or vessel 17 is provided with an inlet port 18 and an outlet port 19 which are spaced from one another and which communicate with the central passage. A radiation source 20 is positioned adjacent one end of housing 17, and a first radiation detector 21 is positioned adjacent the second end of the housing. A radiation tube bundle 22 extends through the central passage of housing 17 between radiation source 20 and detector 21.

As illustrated in FIGS. 3 and 4, tube bundle 22 is formed of a relatively large number of individual tubes 24 which are constructed of radiation transparent material, such as glass. Tubes 24 are called "tubes" in the art because they are light transmitting means, or light transmitting tubes because of the internal reflecting properties of their outer longitudinal surface. However, these tubes are preferably in the physical form of solid glass rods 24, as shown in the drawing. Each of the tubes is provided with a cladding 25 which is formed of a material having a lower refractive index than the material of tube. It is desirable that the two materials have the same coefficient of thermal expansion. The individual tubes can be quite small in diameter, of the order of 0.003 inch (including cladding), for example. More than 100 of these individual tubes can be formed into a bundle 22 having a diameter of approximately 1/16 inch. In the central portion of the tube bundle which extends through housing 17, the claddings 25 are removed from the individual tubes. This can be accomplished, for example, by contacting the tubes with hydrofluoric acid to remove the cladding if glass is employed as the cladding material. It is important that the cladding be removed from the longitudinal central portion of the tube bundle in order that the liquid within housing 17 can make contact with the surface of the individual tubes. The removal of the cladding also tends to separate the individual tubes from one another to minimize the amount of radiation transmitted between the tubes.

In the assembly of the refractometer of FIG. 2, it is also desirable to apply a longitudinal compressive force to the tube bundle to tend to separate individual tubes within the central passage of housing 17. This can be accomplished by the use of end plugs 26 and O-rings 27. Compressive force is applied to the ends of the tube bundle at the time the plugs are inserted so that the O-rings and end plugs exert a clamping force on the tube bundle to maintain the tube under compression. The longitudinal ends of the tube bundle can be provided with coatings 28 of an epoxy resin or other suitable material to further minimize loss of radiation from the tube bundle and to retain the individual tubes in closely spaced relationship with one another.

The second channel of the refractometer of FIG. 2 is of identical construction to that described above, and corresponding elements are designated by like primed reference numerals. Detectors 21 and 21' are photosensitive resistance elements and are connected into a bridge network. First end terminals of these detector elements are connected to one another and to the first terminal of a current source 30. The second terminals of elements 21 and 21' are connected through respective resistors 31 and 31' to the second terminal of current source 30. A current indicator 32 is connected between the second terminals of elements 21 and 21'. The resulting circuit thus constitutes a Wheatstone bridge which serves to compare the amounts of radiation transmitted through the two tube bundles. If liquids having the same refractive indices are positioned in vessels or housings 17 and 17', substantially equal amounts of radiation are lost through the two tube bundles so that detectors 21 and 21' receive equal amounts of radiation. Any change in composition of the effluent from column 10, however, can result in a change in the refractive index of the liquid in housing 17, and this unbalances the bridge network.

It is important to maintain the refractometer of FIG. 2 at a constant temperature because temperature fluctuations change the refractive indices of many liquids. This can be accomplished by positioning the apparatus of FIG. 2 in an insulated housing which is provided with a suitable temperature control mechanism. An important advantage of the refractometer of this invention results from the fact that the sample chambers can be quite small in volume to reduce the amount of fluid needed for an analysis. While a differential refractometer of the type illustrated in FIG. 2 is normally preferred, in some applications a single channel is all that is required because changes in composition of the sample fluid result in changes in the amount of light transmitted. Radiation source 20 can provide radiation in the visible, infrared or ultraviolet spectrum, provided tubes 24 are formed of materials that transmit such radiation. The use of a coherent radiation source is particularly effective.

In FIG. 5 there is illustrated a portion of a second embodiment of a refractometer constructed in accordance with this invention. The refractometer of FIG. 5 employs a housing 17a which is of semi-circular configuration. Tube bundle 22a is thus curved between the inlet and outlet ends. Since each of the tubes is continuously curved, the amount of radiation normally transmitted through the tubes by internal reflection is reduced because of the changed angles at which individual light rays strike the outer surfaces of the tubes. This provides a somewhat greater sensitivity and results in an instrument with a more linear output. The curved tubes of FIG. 5 can be employed in a differential refractometer of the type illustrated in FIG. 2 utilizing a single light source and a pair of adjacent radiation detectors.

While this invention has been described in conjunction with presently preferred embodiments, it should be evident that it is not limited thereto.

What is claimed is:

1. A refractometer comprising:
   a vessel adapted to contain a fluid to be tested;
   a radiation source positioned externally of said vessel;
   a radiation detector positioned externally of said vessel and spaced from said radiation source;
   a bundle of tubes of radiation transmitting material extending from said source to said detector so that radiation is transmitted from said source to said detector by internal reflection through said tubes, the longitudinal central portion of said bundle of tubes extending through said vessel with the tubes in spaced relationship with each other so that fluid within said vessel engages the surfaces of said individual tubes;
   coatings of material surrounding the longitudinal ends of said tubes, which ends are external of said vessel, said coatings being formed of materials having refractive indices which are less than the refractive indices of the materials forming the respective tubes.

2. The refractometer of claim 1 wherein the longitudinal axis of the longitudinal central portion of said bundle of tubes is curved.

3. The refractometer of claim 2 wherein said longitudinal axis is substantially a semi-circle within said vessel.

4. The refractometer of claim 1 wherein said tubes are flexible, and further comprising clamping means to retain said tubes within said vessel so that a longitudinal compressive force is applied to the tubes to tend to separate the individual tubes from one another within said vessel.

5. The refractometer of claim 1, further comprising:
   a second vessel adapted to contain a reference fluid; a second radiation detector positioned externally of said second vessel and spaced from said radiation source;
   a second bundle of tubes of radiation transmitting material extending from said source to said second detector so that radiation is transmitted from said source to said second detector by internal reflection through the tubes of said second bundle, the longitudinal central portion of said second bundle of tubes extending through said second vessel with the tubes in spaced relationship with each other so that fluid within said second vessel engages the surfaces of said individual second tubes; and
   coatings of material surrounding the longitudinal ends of said second tubes, which ends are external of said second vessel, said coatings being formed of materials having refractive indices which are less than the refractive indices of the materials forming the respective second tubes.

6. In a chromatographic analyzer which includes a column containing a partitioning material, first conduit means communicating with the inlet of said column to pass a carrier fluid to the column, and means communicating with the inlet of said column to introduce a sample of material to be analyzed; a detector comprising:
   first and second vessels;
   conduit means communicating with the outlet of said column to pass fluid from said column through said first vessel;
   conduit means connected between said first conduit means and said second vessel to pass carrier fluid through said second vessel;
   a radiation source positioned externally of said first and second vessels;
   first and second radiation detectors positioned externally of said vessels and spaced from said radiation source;
   a first bundle of tubes of radiation transmitting material extending from said source to said first detector to transmit radiation from said source by internal reflection through the tubes of said first bundle to said first detector, the longitudinal central portion of said first bundle of tubes extending through said first vessel with the tubes in spaced relationship with each other so that fluid within said first vessel engages the surfaces of the individual tubes of said first bundle;

a second bundle of tubes of radiation transmitting material extending from said source to said second detector to transmit radiation by internal reflection through the tubes of said second bundle to said second detector, the longitudinal central portion of said second bundle of tubes extending through said second vessel with the tubes in spaced relationship with each other so that fluid within said second vessel engages the surfaces of the individual tubes of said second bundle;

coatings of materials surrounding the longitudinal ends of said tubes, which ends are external of said vessels, said coatings being formed of materials having refractive indices less than the refractive indices of the materials forming the respective tubes; and means to compare the outputs of said first and second detectors.

7. The apparatus of claim 6 wherein the longitudinal central portion of said bundles of tubes are flexible, and further comprising clamping means to engage said bundles of tubes to exert longitudinal compressive forces on the longitudinal central portions of said tubes to maintain the individual tubes in said spaced relationship with one another.

8. The apparatus of claim 6 wherein the central portion of each of said bundles of tubes extend in generally semicircular paths through the respective vessels.

References Cited

UNITED STATES PATENTS

| | | | |
|---|---|---|---|
| 3,027,477 | 3/1962 | Sheldon | 250—227 |
| 3,051,035 | 8/1962 | Root | 250—227 |
| 3,282,149 | 11/1966 | Shaw et al. | 250—227 |

RALPH G. NILSON, Primary Examiner

M. ABRAMSON, Assistant Examiner

U.S. Cl. X.R.

250—227; 356—133